US010997829B2

(12) United States Patent
Bolanos et al.

(10) Patent No.: US 10,997,829 B2
(45) Date of Patent: May 4, 2021

(54) PROJECTING STATUS INDICATOR

(71) Applicant: Beckman Coulter, Inc., Brea, CA (US)

(72) Inventors: Francisco Bolanos, Miami, FL (US);
Marco T. Gonzalez, Miami, FL (US);
Enrique Olivera, Marco Island, FL (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 16/389,034

(22) Filed: Apr. 19, 2019

(65) Prior Publication Data
US 2019/0325713 A1 Oct. 24, 2019

Related U.S. Application Data

(60) Provisional application No. 62/660,329, filed on Apr. 20, 2018.

(51) Int. Cl.
| | |
|---|---|
| *G08B 5/36* | (2006.01) |
| *G02B 27/32* | (2006.01) |
| *G03B 21/20* | (2006.01) |
| *G03B 21/14* | (2006.01) |
| *G02B 30/56* | (2020.01) |
| *F21Y 115/10* | (2016.01) |

(52) U.S. Cl.
CPC .............. *G08B 5/36* (2013.01); *G02B 30/56* (2020.01); *G03B 21/145* (2013.01); *G03B 21/2013* (2013.01); *F21Y 2115/10* (2016.08)

(58) Field of Classification Search
CPC .... G08B 5/36; G02B 27/2292; F21Y 2115/10
See application file for complete search history.

(56) References Cited

U.S. PATENT DOCUMENTS

| 2010/0265595 A1* | 10/2010 | Tochigi ............... G02B 15/177 |
| | | 359/682 |
| 2017/0330430 A1* | 11/2017 | Goodfield ............... G08B 5/36 |
| 2019/0024882 A1* | 1/2019 | Jonsson ................... A61G 5/10 |

FOREIGN PATENT DOCUMENTS

| EP | 3135262 A1 | 3/2017 |
| WO | WO-2010103477 A1 | 9/2010 |
| WO | WO-2013027852 A1 | 2/2013 |
| WO | WO-2019204685 A1 | 10/2019 |

OTHER PUBLICATIONS

"International Application Serial No. PCT/US2019/028250, International Preliminary Report on Patentability dated Oct. 29, 2020", 9 pgs.

* cited by examiner

*Primary Examiner* — William C. Dowling
(74) *Attorney, Agent, or Firm* — Schwegman Lundberg & Woessner, P.A.

(57) ABSTRACT

Embodiments of the present disclosure relate generally to a projecting status indicator for use in connection with a laboratory machine or instrument (collectively referred to as a "unit"). The indicator projects a projected visible light image or beam of light in a line directly above a particular unit so that lab personnel can tell the status of the unit from a distance. In a specific embodiment, the indicator projects an extended line of light on a ceiling above the unit, rather than a small point of light.

20 Claims, 9 Drawing Sheets

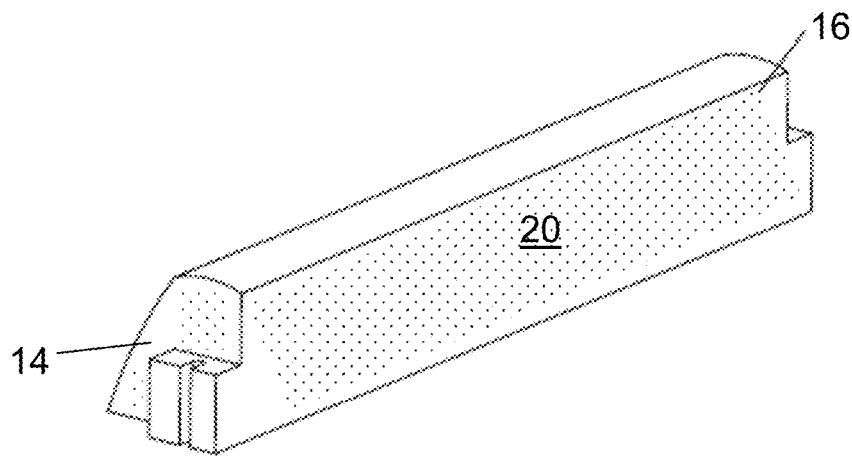
FIG. 6
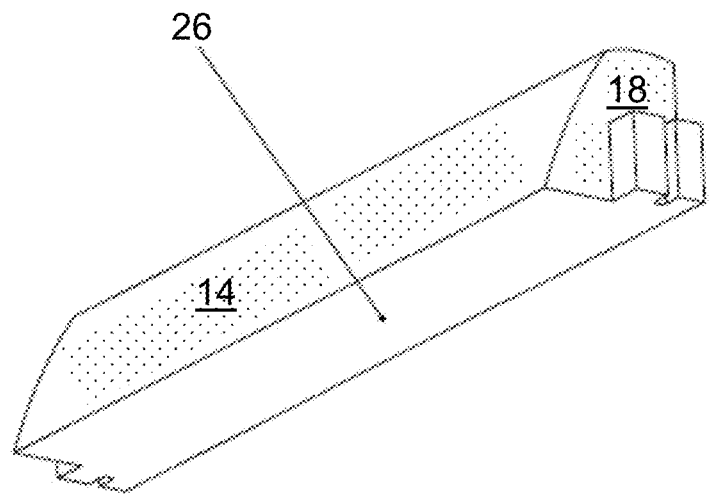
FIG. 7A
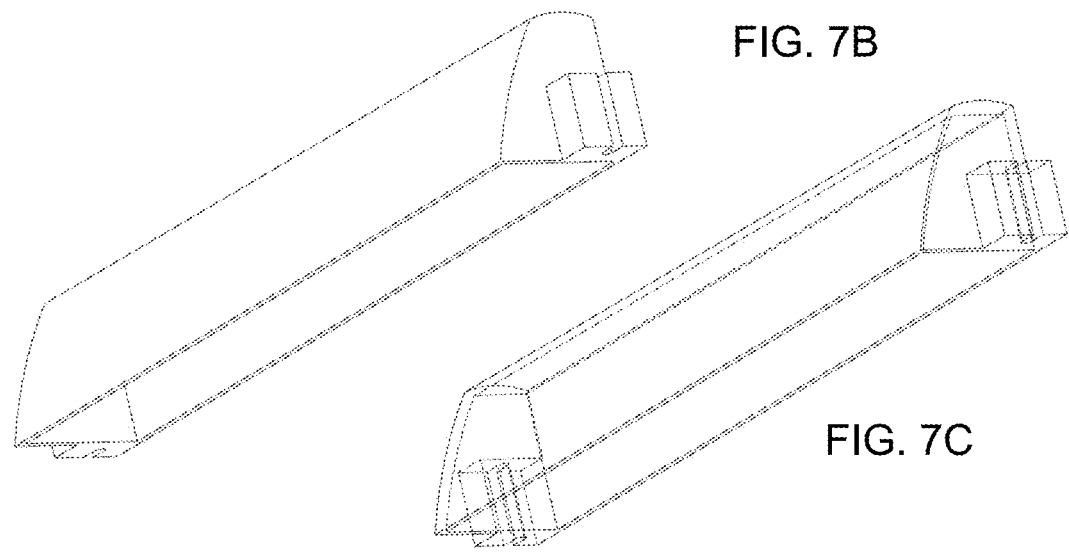
FIG. 7B
FIG. 7C

SECTION A-A

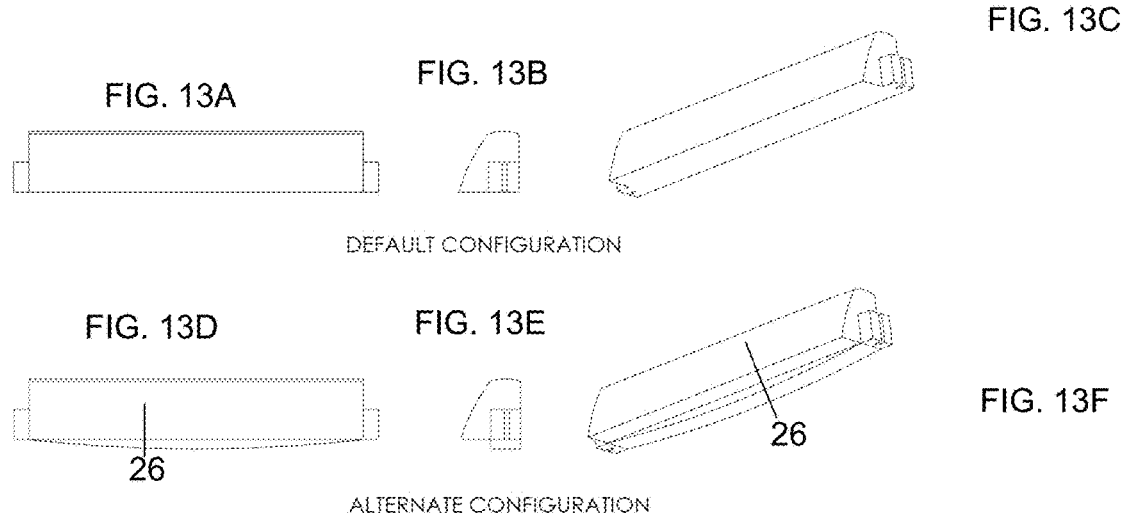
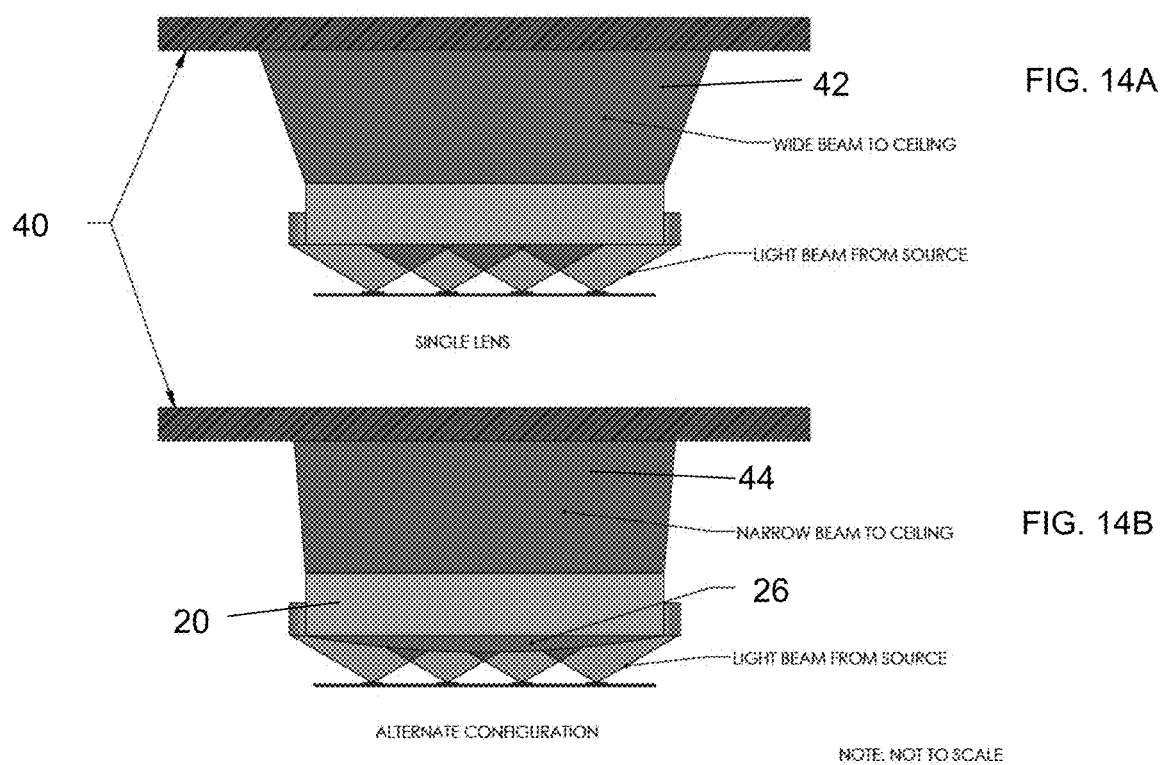

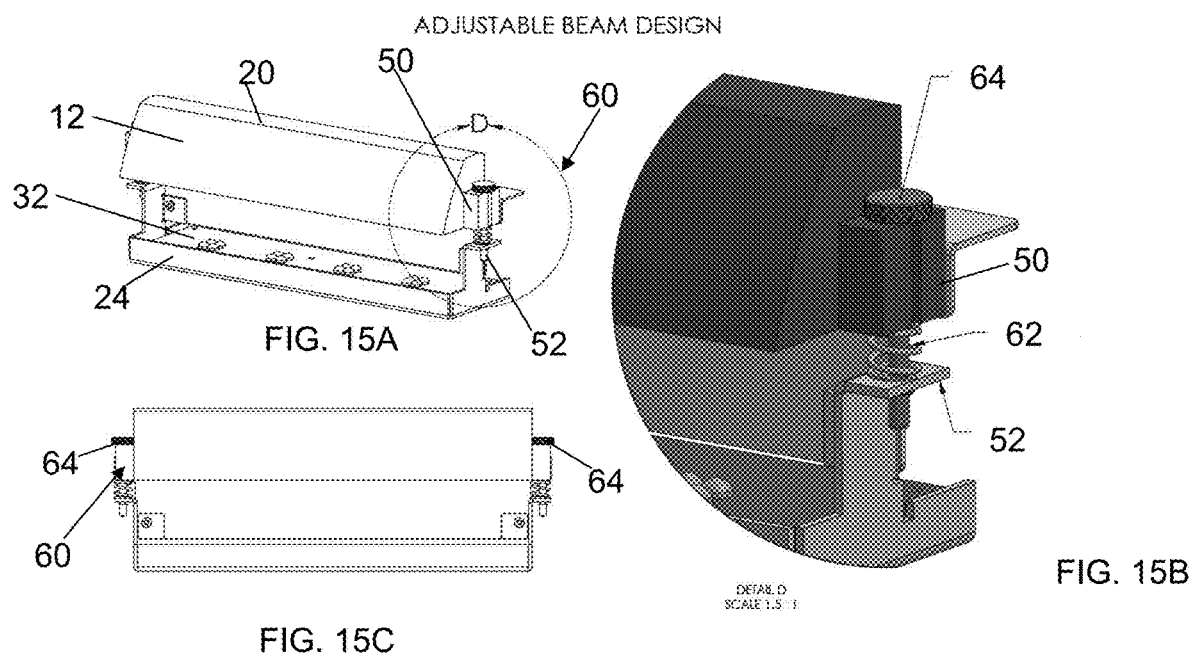
FIG. 15A
FIG. 15B
FIG. 15C
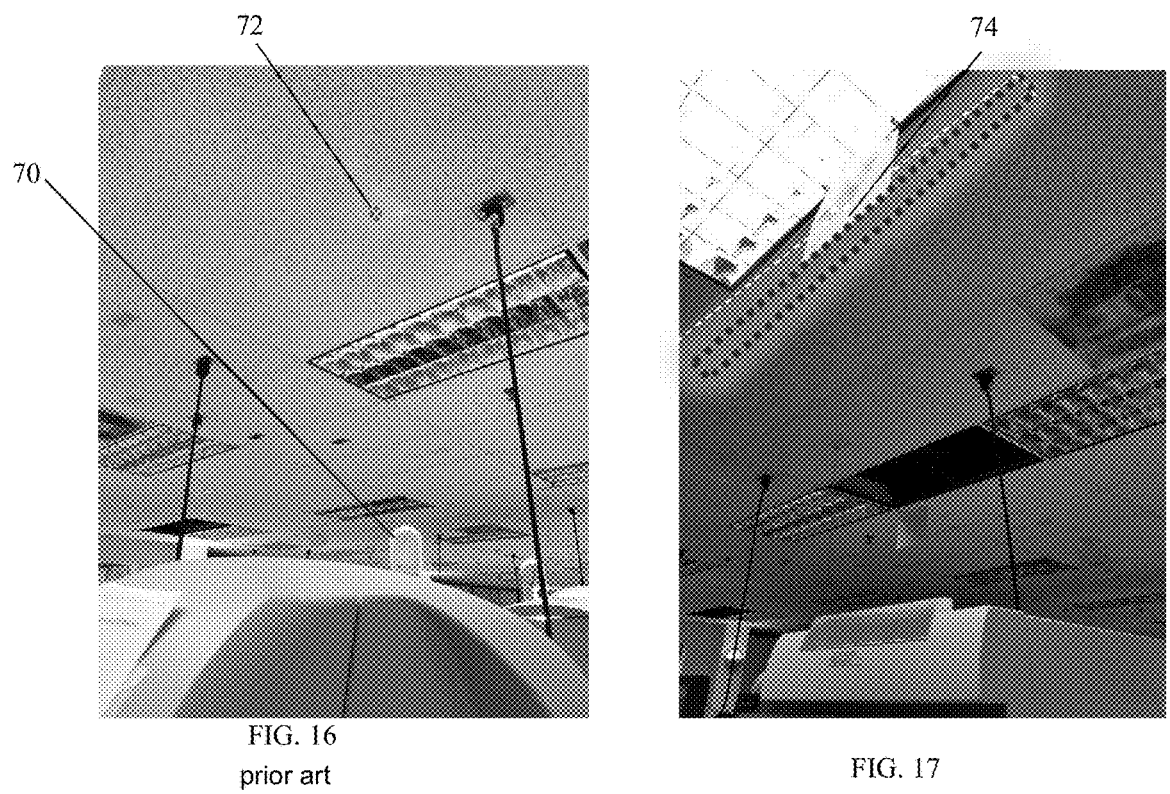
FIG. 16
prior art
FIG. 17

US 10,997,829 B2

PROJECTING STATUS INDICATOR

CROSS-REFERENCES TO RELATED APPLICATIONS

This application is a non-provisional of and claims the benefit of priority to U.S. Provisional Patent Application No. 62/660,329, filed Apr. 20, 2018, entitled "PROJECTING STATUS INDICATOR," the entire contents of which are herein incorporated by reference.

FIELD OF THE DISCLOSURE

Embodiments of the present disclosure relate generally to a projecting status indicator for use in connection with a laboratory machine or instrument (collectively referred to as a "unit"). The indicator projects a visible light image or beam of light directly above a particular unit so that lab personnel can tell the status of the unit from a distance. In one example, the indicator projects an extended line of light on a ceiling above the unit.

BACKGROUND

In a laboratory environment, a number of units may often be running samples and collecting data at the same time. In many instances, multiple rows of units may be managed and monitored by a limited number of laboratory technicians or personnel.

Some current units have indicator lights that indicate the unit's status. Such status indicators are usually provided as a small button on the front of the unit. In examples in which the status indicator light has been made more prominent, the status indicator light structure 70 may be a raised, curved arch made of a translucent material that protrudes above the upper surface of the unit. An LED light associated with the status indicator light structure may cause the translucent material to glow the desired color. In some examples, a single point of light 72 may be emitted. One example is illustrated by FIG. 16.

One challenge presented by the current laboratory indicator light standard is that although the lights are positioned on the unit and although they indicate the status of the unit, they are not easily viewable unless the laboratory technician or personnel is looking directly at the unit, often standing directly in front of the unit or in a direct line of sight of the unit. However, in a laboratory with multiple rows of machines/instruments/units, a single person may be running a number of units at one time, without a direct line of sight to the status indicator of a particular unit. Factors that present challenges to the view of status indicator may depend upon the height of the unit, the height of the status indicator itself, and/or the height of the person attempting to read the status indicator. Improvements are thus desirable.

BRIEF SUMMARY

Embodiments of the invention described herein thus provide systems and methods for a status indicator system for a laboratory unit, the system comprising: a plurality of indicator lights; a light cover positioned above the plurality of indicator lights, the light cover comprising an optically clear upper surface and frosted front and side surfaces; wherein the optically clear upper surface defines a convex lens that projects a visible light beam through the light cover to a surface above the status indicator system, wherein a distance between the plurality of indicator lights and the light cover is optimized to provide a projected visible light image onto the surface.

Embodiments also provide a method of projecting a status indicator, the method comprising projecting a colored light of sufficient brightness and focus to be visible to the unaided human eye in a lit room within +/−50% of the footprint of a machine projecting the colored light.

BRIEF DESCRIPTION OF THE DRAWINGS

FIG. 6 shows a rear perspective view of one embodiment of a light cover.

FIG. 7A shows a front perspective view of the light cover of FIG. 6.

FIG. 7B shows a light cover that has a hollow interior.

FIG. 7C shows the light cover of FIG. 7B to illustrate the translucent nature of the light cover by phantom lines.

FIGS. 13A-13C show a light cover having a single upper lens. FIG. 13A shows a front plan view of the light cover. FIG. 13B shows a side plan view of the light cover. FIG. 13C shows a side perspective view of the light cover.

FIGS. 13D-13F show a light cover having an upper lens and a lower lens. FIG. 13D shows a front plan view of the light cover. FIG. 13E shows a side plan view of the light cover. FIG. 13F shows a side perspective view of the light cover.

FIG. 14A shows a light reflection schematic of the embodiment of FIG. 13A.

FIG. 14B shows a light reflection schematic of the embodiment of FIG. 13B.

FIG. 15A shows a side perspective view of one embodiment of an adjustable beam, being adjusted via an adjustable bracket system.

FIG. 15B shows a close-up view of section D of FIG. 15A.

FIG. 15C shows a front plan view of the configuration of FIG. 15A.

FIG. 16 shows a unit in use in a laboratory setting having a prior art light indicator.

FIG. 17 shows a unit in use in a laboratory setting using one embodiment of a projecting status indicator described herein.

DETAILED DESCRIPTION

Figure 1:
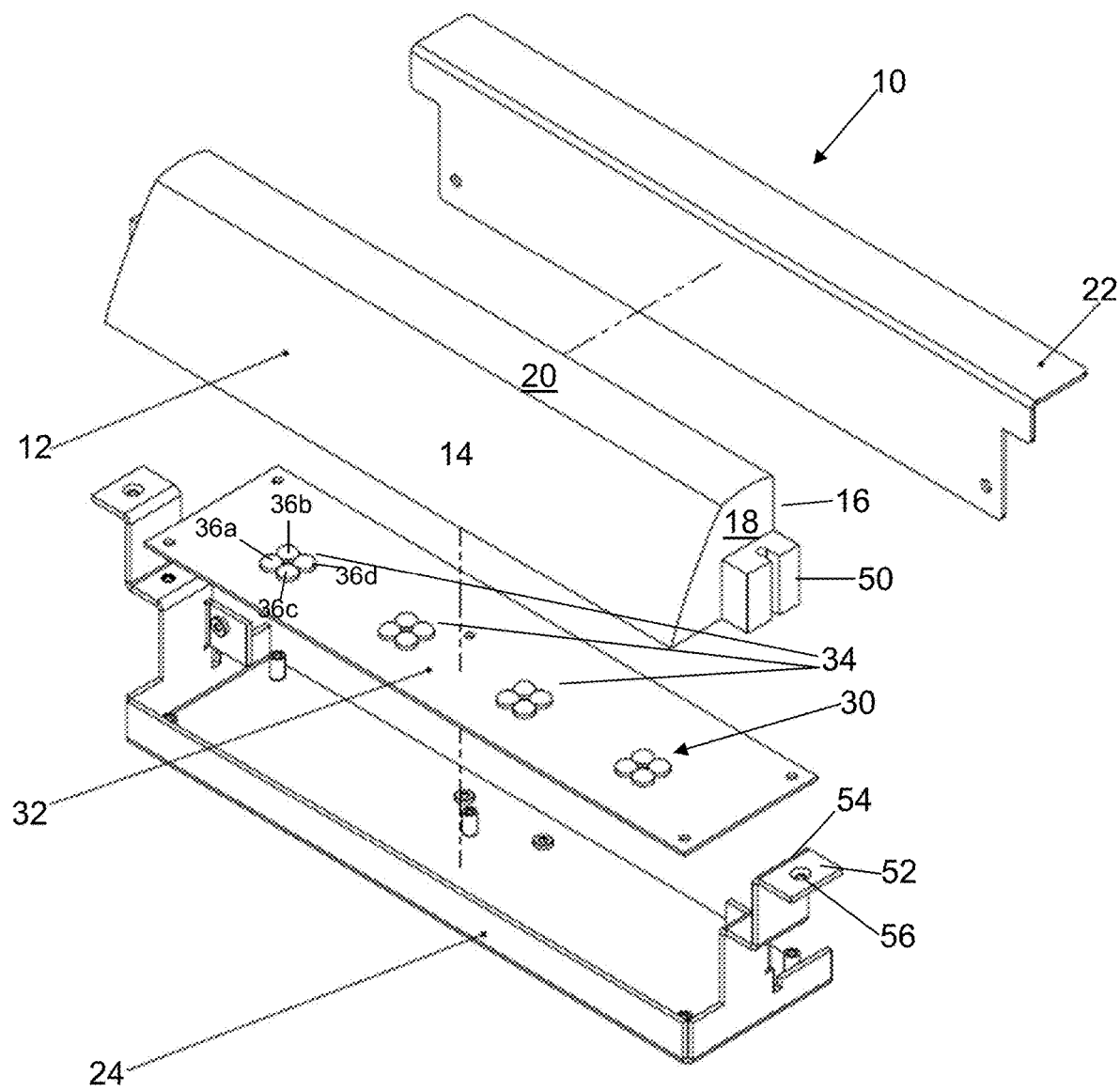
FIG. 1 shows an exploded perspective view of one embodiment of a status indicator system.
Figure 2:
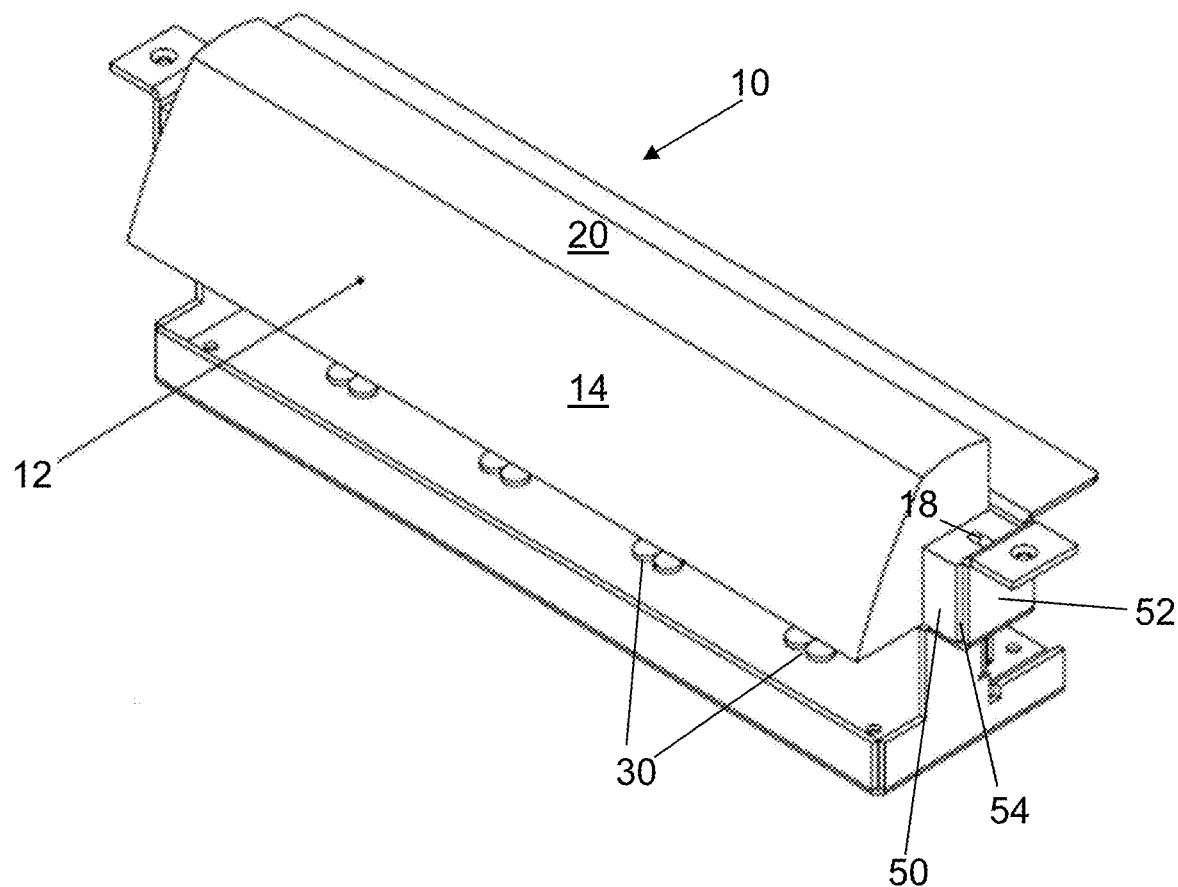
FIG. 2 shows the status indicator system of FIG. 1 in an assembled configuration.
Figure 3:
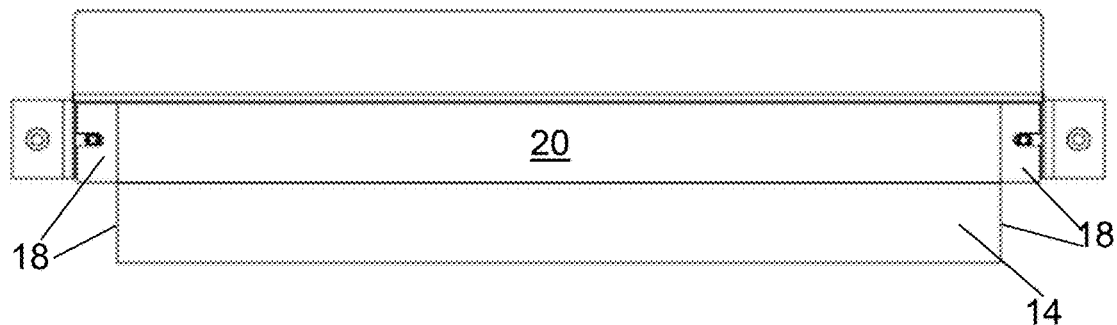
FIG. 3 shows a top plan view of the status indicator system of FIG. 2.
Figure 4:
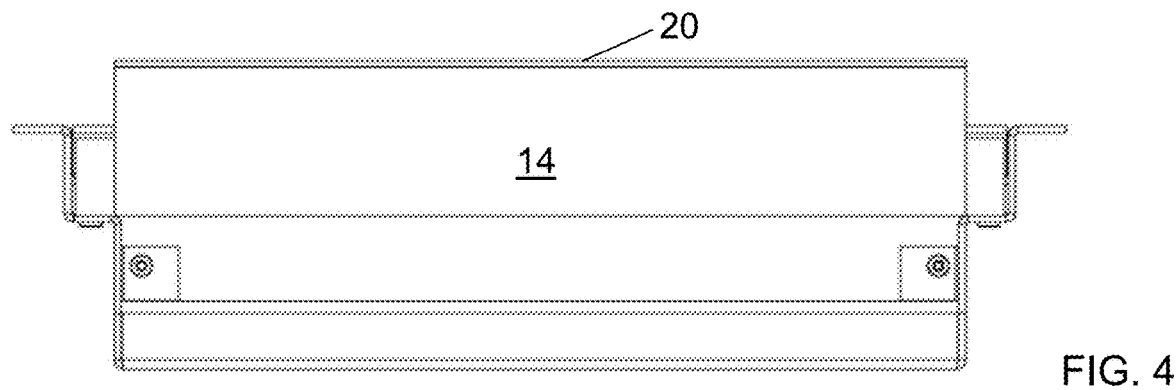
FIG. 4 shows a front plan view of the status indicator system of FIG. 2.
Figure 5:
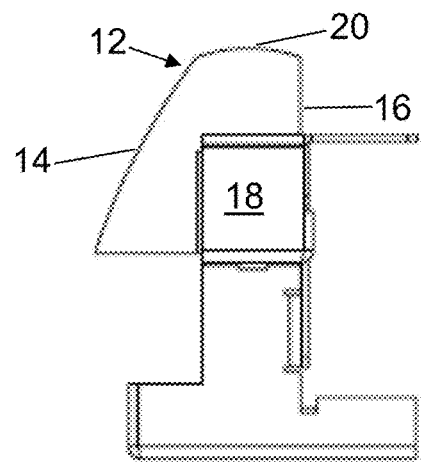
FIG. 5 shows a side plan view of the status indicator system of FIG. 2.
Figure 8:
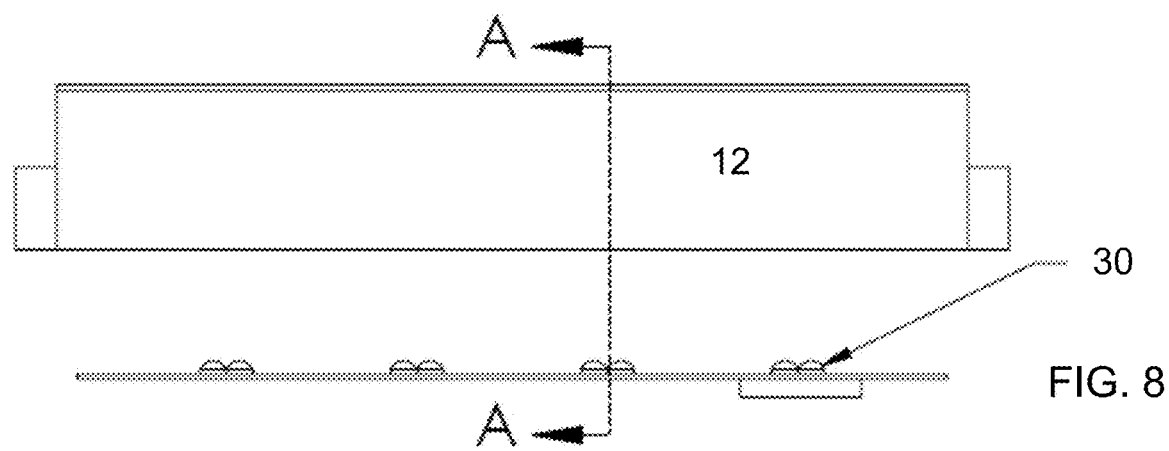
FIG. 8 shows a front plan view of a light cover in relation to a plurality of indicator lights.
Figure 9A:
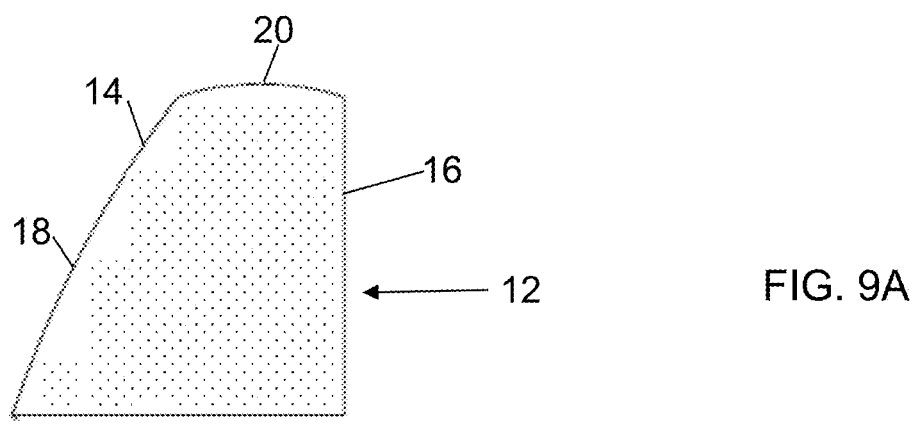
FIG. 9A shows a side plan view of the light cover of FIG. 8.
Figure 9B:
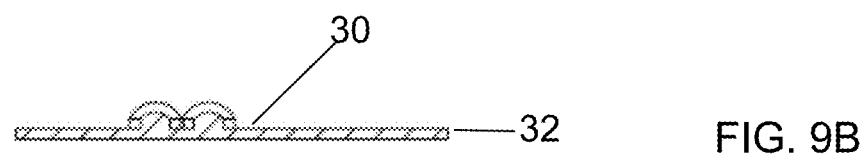
FIG. 9B shows a side cross-sectional view along line A-A of FIG. 8.

Embodiments of the present disclosure provide a status indicator system 10 designed to be mounted on a laboratory machine, instrument, or unit. The unit may be a cellular analyzer, a slide-making machine, a flow cytometer, an automated or semi-automated imaging device, a centrifuge, a shaker/mixer, or any other type of machine used in research or medical laboratories.

The status indicator system 10 uses a plurality of indicator lights to indicate the status of the unit. Although specific colors options are described, it should be understood that any type of indicator lights may be used with the system described herein. For example, a green light may indicate that the unit is running smoothly, processing samples as intended, and otherwise does not need any attention. A red light may indicate that the unit has stopped running, is having a problem, or that samples are not currently being processed although the unit is powered/on/intended to be running. A yellow or amber light may indicate that the unit needs attention, but is still currently working. For example, the unit may be low on reagents, may be ready for reloading shortly, or otherwise needs attention from a laboratory technician soon in order to continue running at its current pace. A blue light may indicate that the unit is off-line/not currently processing, but is ready for samples and does not otherwise have a problem. Alternate and/or additional indicator lights are of course possible. These status indicator lights usually emit a constant beam of color, but it should be understood that it is possible to provide blinking or rotating indicator lights as well.

Laboratories are usually well-lit. In order to ensure that the status light is viewable, the status indicator system is designed to be bright/focused in order to compete with ambient room lights and/or daylight. In other words, the system is easily viewable in daylight, not only in darkness or in a darkened atmosphere.

One primary feature of the status indicator system 10 is the light cover 12. Below or otherwise associated with the light cover 12 is a series of lights 30 configured to direct light into and onto surfaces of the light cover 12. The light cover 12 is configured with at least one surface that allows light to pass through the light cover 12 to create an indicating light or line on an external surface (such as a ceiling or wall), and other surfaces that contain or scatter the light in order to illuminate the light cover 12 itself.

As illustrated by FIGS. 1-9, one example of a light cover 12 is an elongated light pipe having a front surface 14, a rear surface 16, side surfaces 18, and an upper surface 20. The front surface 14 may have a forward and downward slope. The rear surface 16 may be configured to cooperate with an optional backing plate 22. The backing plate 22 can block light from exiting the rear surface of the light cover 12. (Optional backing plate 22 may also be used for mounting the status indicator to a unit. Additionally or alternatively, a separate mounting bracket 24 (described further below) may be provided. The mounting bracket 24 generally supports the lightboard 32 and mounts the completed system 10 to a unit.)

Although a particular shape of the light cover 12 is shown and described, it should be understood that the light cover may be any appropriate shape or dimension. For example, the light cover 12 may be an extended oval or circular tube, a square or rectangle, may have a triangular cross sectional shape, an arc shape, or any other desired shape. In a specific but non-limiting example, the light cover is about 11 inches long, about 2 inches deep, and about 2 inches tall (such that it extends about 2 inches above the unit).

The front, rear and side surfaces (14, 16, and 18) of the light cover 12 are configured such that they scatter light and illuminate the light cover 12. In a specific example, these surfaces are frosted, textured, or otherwise treated to be opaque such that they cause projected light to diffuse. This frosting is shown in schematic dotted lines in FIGS. 6, 7, and 9. The upper surface 20 (and the lower surface 26, if provided) are configured such that they are optically clear in order to allow light to pass through. For example, the surface(s) (20 and/or 26) may be transparent, clear, or otherwise untreated material such that they allow light to pass directly through. In certain examples, the light cover 12 is made of a solid material throughout its entire body. The internal material of the body is translucent. The upper surface 20 of the light cover body is similarly clear, translucent material that allows direct passage of light. The front and sides are frosted or otherwise opaque. In other examples, it is possible for the light cover 12 to be a hollow structure, such that it has a curvature with a hollow interior space and no lower surface, as example of which is illustrated by FIG. 7B.

The upper surface 20 is generally provided with a convex shape. In some examples, upper surface 20 functions as a lens to help direct and focus light in a particular direction. If provided, the lower surface 26 of the light cover 12 may be a flat surface. In other examples, the lower surface 26 of the light cover may have a lens with a curvature (as described below). The upper surface 20 is convex with a fixed cross-section in the direction of the length of the light cover. It has been found that this shape allows the light cover 12 to act as a cylindrical piano-convex lens.

The plano-convex lens focuses the light exiting the top of the status indicator system 10 into a visible horizontal beam 74 that projects onto the ceiling 40 above the unit. An illustrative example of this projection is provided by FIGS. 10-12 and 17. As shown, this creates a bright, focused band of light/color over a particular unit—on the ceiling 40 directly above the unit. By providing the upper surface 20 of light cover 12 with a convex shape and translucent/light transmitting qualities, light entering the light cover 12 is projected directly upward and out of the light cover 12, away from the front surface 14 and side surfaces 18 of the light cover 12. Front 14 and side surfaces 18 are illuminated, but due to being frosted, light does not project outwardly therefrom. This disclosed light cover design projects light upward and away from the light cover 12 itself, which is counterintuitive to what is considered the conventional viewing surface of status indicators.

This light projection configuration is in contrast to prior art status indicator lights. Previous lights illuminated light out toward side surfaces of the status indicator. In some examples, they project only a small pinpoint of light upwardly or outwardly. Any reflection or extension of the light was solely due to accidental reflections (e.g., reflection in glass cabinet doors or windows in the laboratory). Such light reflections were uncontrolled, not associated with a particular unit, and might only be visible in the direct line of sight of the machine. Now, by focusing a bright beam of light directly above a particular unit, laboratory personnel can clearly see—from nearly anywhere in the room—the status of a particular machine, with confidence that a particular light is being projected by a particular machine, and is not a reflection of a reflection, or light "pollution" from other electronics, such as computers, printers, cell phones, fax machines, etc. that may also be in the laboratory or testing environment. In a specific example, the light band may be slightly less than the width of the footprint of the instrument (~90% or). This length can prevent the lights of adjacent units from overlapping.

The light cover 12 may be made of any appropriate material that displays the above-described properties. In a specific example, the light cover 12 is manufactured of an acrylic material. It should be understood, however, that the light cover may be formed of acrylic, glass, polyurethane, other types of clear or translucent materials, or any combination thereof.

The light to be projected toward the light cover 12 may come from below the light cover. As illustrated by FIGS. 1, 2 and 8-12, a series of lights 30 may be mounted on a lightboard 32. The upper surface of the lightboard 32 supports the lights 30. Although not shown, a lower surface of the lightboard 32 may support a series of electrical connections that deliver power to the lights. In other embodiments, it is possible for the lights to be battery-operated or to have a backup battery system in the event of loss of electrical power. The light may be individually powered or powered as a group/per pod or powered as a lightboard comprising two or more groups/pods.

Referring back to FIG. 1, as shown, it has been found useful to provide a lightboard 32 having a length that is similar to the length of the light cover 12. In a specific example, the lightboard 32 is provided with a plurality of light pods 34. It has been found that providing multiple lights helps increase the brightness of the beam and increases the uniformity of the status indicator's direct illumination. Each light pod 34 has one or more lights that correspond to a unit status. For example, as described above, if a particular unit is provided with status indicators that are green, red, yellow, and blue, then each light pod 34 may have at least one green light 36a, at least one red light 36b, at least one yellow light 36c, and at least one blue light 36d. In another example, each pod 34 may be a collection of lights of a similar color, with each pod displaying a different color. For this example, the geometry of the upper surface should be designed to allow appropriate spread of projected light. A circular lens may be used in this instance. In a further example, a pod may be replaced with a single color-changing LED.

The lights may be provided as any appropriate light source. In a specific example, use of light emitting diodes (LEDs) is particularly effective. LEDs emit a strong and bright light, while also being energy efficient. It is also possible, however, for the lights to be laser lights, incandescent lights, fluorescent lights, or any other appropriate light source. It is generally expected that only a single light (36a, 36b, 36c, or 36d) will be illuminated at one time, although that corresponding color of light from each light pod 34 may be activated. If desired, combinations of light colors could be used, either as a multi-color signal or to create additional colors (e.g., using yellow and red lights to create an orange projection).

Figure 10:
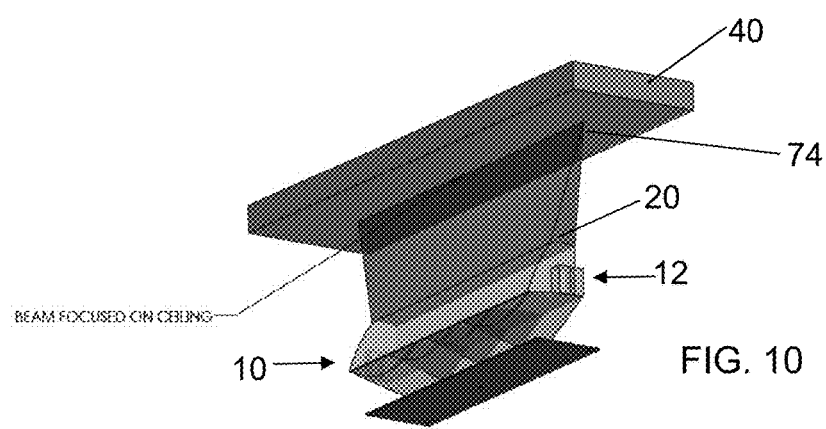
FIG. 10 shows a side perspective view of a status indicator projecting a visible light beam on a ceiling.
Figure 11:
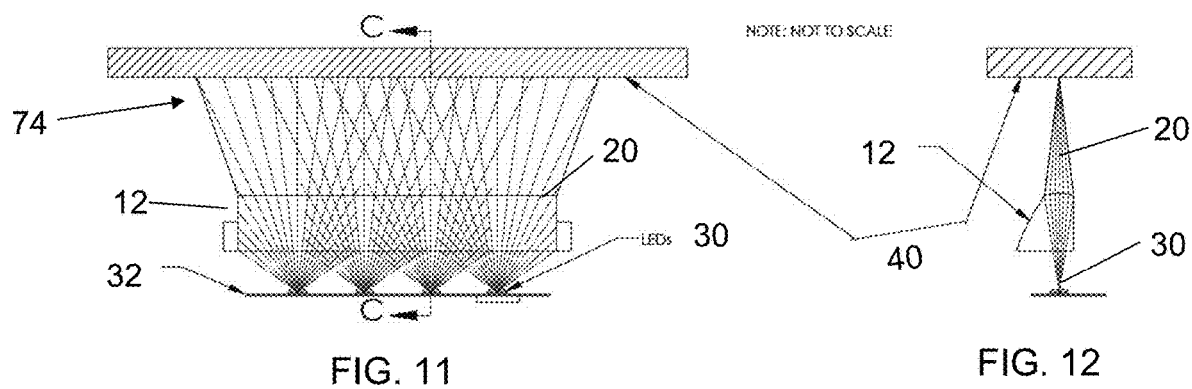
FIG. 11 shows a front schematic view of FIG. 10.
Figure 12:
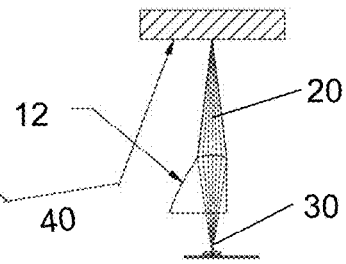
FIG. 12 shows a side schematic view of FIG. 10.

As shown by FIGS. 10-12, a particular light color exiting the lights 30 on the lightboard 32 reaches the light cover 12. The light projects up through the light cover 12 and exits the optically clear upper surface 20. Some light is also scattered within the light cover 12 due to frosted surfaces 14, 18 so that the front surface 14 and side surfaces 18 of the light cover 12 are also allowed to "glow" the selected color. The light exiting the light cover 12 is projected onto the surface above, which in most instances, is ceiling 40.

This single lens design (in which upper surface 20 defines the first lens) shapes the beam in one direction. However, in connected systems or crowded laboratories, beams from adjacent units may extend beyond the dimensions of a particular machine and/or overlap with one another. This could render it difficult to discern the status of adjacent machines from a distance, because the status beams 74 that are projected may overlap with one another. Accordingly, in such a case, an alternative design incorporates a second lens on the bottom of the light cover. The curvature of this lens may be perpendicular to the top lens 20.

As illustrated by FIGS. 13B and 14B, this alternate configuration provides a lower surface lens 26. Introduction of this secondary lens within the light cover 12 can help to focus the light band side-to-side, reducing potential overlap with nearby machines. This configuration may also provide a brighter projection due to the light being concentrated in a smaller area. As shown in FIG. 14A, a single lens beam 42 may project a wide beam to the ceiling 40. As shown in FIG. 14B, the double lens beam 44 may be narrowed to project a more limited, narrow beam to the ceiling 40. The lower surface lens 26 may be convexly shaped. The lower surface lens 26 may be designed using the below-described equations.

The following equations may be used to determine the radius of curvature for the upper surface 20 and/or the lower surface lenses.

$$\frac{1}{f} = \frac{1}{u} + \frac{1}{v}$$

$$\frac{1}{f} = (n-1)\left(\frac{1}{R}\right)$$

Figure 18:
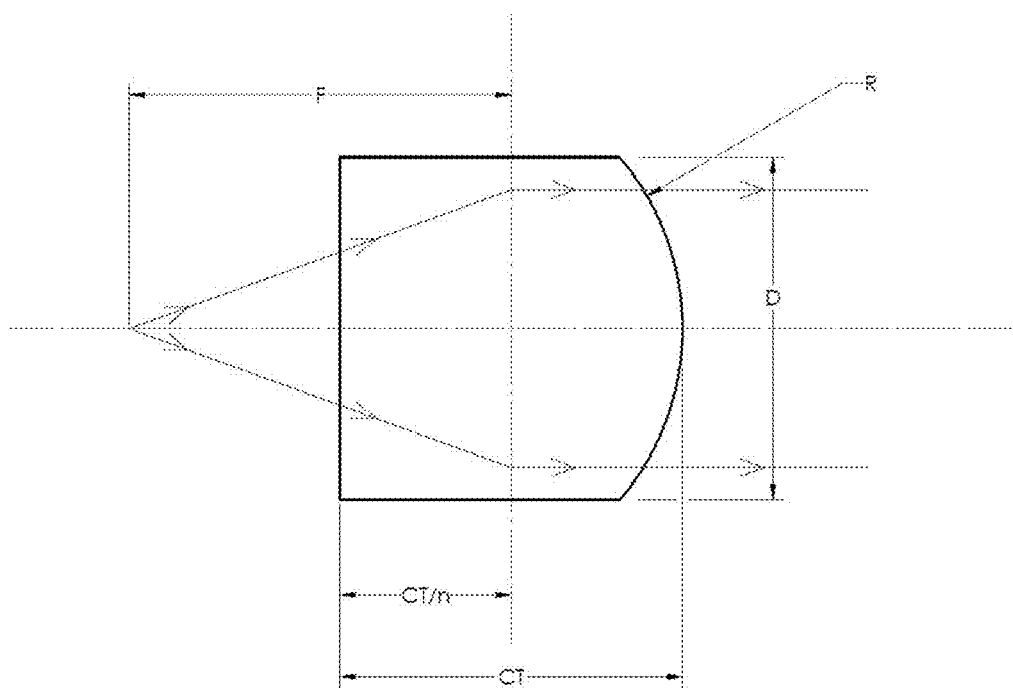
FIG. 18 provides a visual image to help illustrate the lens equation described herein.

Where:
f=focal length
u=distance from the object (LED) to the lens
v=distance from the lens to the image (ceiling)
n=refractive index of the lens material
R=radius of curvature In this equation, the focal length is the distance from the LED to the principal plane of the lens. This is illustrated by the schematic of FIG. 18. These equations can be used to define a configuration that will give the narrowest/most focused beam. Depending upon the physical parameters of the light cover lens (the upper surface 20), the resulting beam may be too small to be easily discernible from a distance by users. The focal length or mounting distance of the LEDs can thus be adjusted, e.g., ±15%, to define an effective beam size.

It should be understood that these parameters can be manipulated in order to achieve desired results based on physical constraints or user preferences. It may be desirable for a particular light reflection to have a particular length or thickness, depending upon the lighting conditions in the laboratory. The ceiling height between various laboratories may vary, the height of the machine relative to the ceiling (e.g., using free-standing or bench-top units, or due to installation conditions, such as uneven or varied flooring at different locations in the laboratory) may vary, and the refractive index may vary. Laboratory technicians may desire a brighter projection image. In these instances, it is possible to adjust the distance between the light (LED) and the lens (upper surface 20). Mounting and adjustability options are described further below.

Another way to alter the projecting beam may be to provide an adjustable bracket system 60. Without adjustability, the status indicator system 10 may be mounted to a unit via mounting bracket 24. The light cover 12 may have one or more connection features 50 that extend from sides of the lights cover 12, as shown. The connection features 50 are configured to cooperate with bracket connections 52 that extend from sides of the mounting bracket 24. In the specific example shown, the bracket connections 52 have a flat inner surface 54 with a fastener receiving portion 56. In use and as shown in labeled FIGS. 1 and 2, the connection feature(s) 50 (one of each side of the light cover 12) rest in between the surface(s) 54 (one of each side of the bracket). A fastener (not shown) may be positioned through the connection feature 50 and through the fastener receiving portion 56. In many embodiments, this connection is stable and not intended to be adjustable.

In other embodiments, however, it may be desirable to change the distance between the lower surface 26 of the light cover 12 and the lightboard 32. This may be accomplished via an adjustable bracket system 60, shown by FIGS. 15A-15C. It may be desirable to alter the distance between the light cover 12 and the lightboard 32. The height of the lightboard 32 may be adjusted (e.g., raised or lowered) and/or the height of the light cover 12 may be adjusted. Either the LED lightboard 32, the light cover 12, or both may be mounted in such a fashion that the distance between the lens 26 and/or the light source 30 can be adjusted by the user to achieve a desired focus. This can be via any common mechanism such as screws, slots, holes with spring plungers, clamps, or any other appropriate adjustable mechanism, including, without limitation, motorized or automated adjustment mechanisms.

In one specific example as illustrated by FIGS. 15A-15C, a spring 62 is positioned between the bracket connection 52 and the connecting feature 50. The spring 62 maintains tension. A thumbscrew 64 or other adjustable fastener may be used to adjust the distance between the light cover 12 and the lightboard 32. If the light cover 12 is fixed to the unit (e.g., via backing plate 22 or other connection feature), the thumbscrews 64 are used to adjust the distance of the light source to the lower lens 26, thus changing the focus of the beam. If the mounting bracket 24 maintains the lightboard 32 in a fixed position with respect to the unit, the thumbscrew 64 may be used to adjust the distance of the light cover 12 with respect to the lightboard 32 (moving the light cover 12 toward or away from the lightboard 32).

Although certain embodiments have been shown and described, it should be understood that changes and modifications, additions and deletions may be made to the structures and methods recited above and shown in the drawings without departing from the scope or spirit of the disclosure or the following claims.

What is claimed is:

1. A status indicator system for a laboratory unit, the system comprising:
   a plurality of indicator lights;
   a light cover positioned above the plurality of indicator lights, the light cover comprising an optically clear upper surface and frosted front and side surfaces;
   wherein the optically clear upper surface defines a convex lens that projects a visible light beam through the light cover to a surface above the status indicator system,
   wherein a distance between the plurality of indicator lights and the light cover is optimized to provide a projected visible light image onto the surface.

2. The system of claim 1, wherein the optically clear upper surface defines a plano-convex lens.

3. The system of claim 1, wherein the plurality of indicator lights comprise light emitting diodes.

4. The system of claim 1, wherein the plurality of indicator lights are positioned in light pods.

5. The system of claim 4, wherein the light pods define four indicator lights per pod.

6. The system of claim 1, wherein the plurality of indicator lights are positioned on a lightboard.

7. The system of claim 1, wherein the light cover comprises a second lower lens surface.

8. The system of claim 7, wherein the second lower lens surface comprises a plano-convex lens.

9. The system of claim 1, wherein the status indicator system is adjustable such that a distance between the plurality of indicator lights and the light cover may be changed to alter the shape of the projected visible light image.

10. The system of claim 1, further comprising a mounting bracket to which a lightboard supporting the plurality of indicator lights is secured.

11. The system of claim 10, wherein the mounting bracket comprises bracket connections, wherein the light cover comprises connection features, and wherein cooperation between the bracket connections and the connection features secures the light cover to the mounting bracket.

12. The system of claim 10, further comprising an adjustable bracket system that allows adjustability between the lightboard and the light cover.

13. The system of claim 1, further comprising a backing plate secured to a rear surface of the light cover to prevent light from exiting the rear surface.

14. A method of projecting a status indicator, the method comprising projecting a colored light of a size that is within +/−50% of the footprint of a machine projecting the colored light and the light being of sufficient brightness and focus to be visible to the unaided human eye in a lit room where the machine is located.

15. The method of claim 14, wherein the colored light changes based on a status of the machine.

16. The method of claim 15, wherein the colored light is focused into a line or band that is slightly less than the width of its related machine.

17. The method of claim 14, further comprising providing a lens to focus the colored light on a surface above the machine.

18. The method of claim 17, wherein the lens can be adjusted to focus the colored light on the surface under varying environmental conditions.

19. The method of claim 18, wherein the environmental conditions comprise one or more of ceiling height, equipment height, ambient brightness of room and user preference.

20. The method of claim 18, further comprising adjusting the lens.

* * * * *